United States Patent Office 3,775,374
Patented Nov. 27, 1973

3,775,374
THERMOPLASTIC COPOLYETHERESTERS BASED ON 2,6-NAPHTHALENE-DICARBOXYLIC ACID
James Richard Wolfe, Jr., Wilmington, Del., assignor to E. I. du Pont de Nemours and Company, Wilmington, Del.
No Drawing. Filed June 5, 1972, Ser. No. 259,676
Int. Cl. C08g 17/08
U.S. Cl. 260—75 R                    8 Claims

ABSTRACT OF THE DISCLOSURE

A segmented thermoplastic copolyetherester containing recurring polymeric long chain ester units derived predominantly from 2,6-naphthalenedicarboxylic acid and long chain glycols and short chain ester units derived predominantly from 2,6-naphthalenedicarboxylic acid and low molecular weight diols. At least about 91% and preferably about 95% of the total number of short chain ester units must be derived from 2,6-naphthalenedicarboxylic acid and a single low molecular weight diol, preferably an aliphatic straight-chain diol containing 3, 5 or 7–10 carbon atoms. A polymer in the fiber-forming molecular weight range formed solely from the total short chain ester units would have a melting point of between 100 and 199° C.

BACKGROUND OF THE INVENTION

Linear copolyetheresters have been produced heretofore for various purposes, particularly for the production of films and fibers, but known polymers of this type are not suitable for some applications, particularly those where low melting point, fast crystallization, unusually high tear strength, tensile strength and scuff resistance is needed. Such applications include hot-melt adhesives, caulks, heat-sealable films, castings and coatings. In these uses, a copolyetherester having outstanding physical properties and a melting point well below the temperature level at which polymer degradation takes place at a significant rate woud be most advantageous. Thus a need for such a polymer exists.

SUMMARY OF THE INVENTION

According to this invention there is provided an improved thermoplastic copolyetherester elastomer which possesses the above-mentioned characteristics. The elastomer consists essentially of a multiplicity of recurring intralinear long chain and short chain ester units connected head-to-tail through ester linkages, said long chain ester units being represented by the following structure:

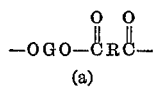

(a)

and said short chain ester units being represented by the following structure:

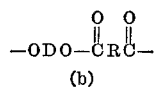

(b)

wherein:

G is a divalent radical remaining after removal of terminal hydroxyl groups from poly(alkylene oxide) glycols having a carbon-to-carbon ratio of about 2.0–4.3 and molecular weight between about 400 and 6000;

R is a divalent radical remaining after removal of carboxyl groups from a dicarboxylic acid having a molecular weight less than about 300; at least 91% and preferably at least about 95% of the dicarboxylic acid is 2,6-naphthalenedicarboxylic acid; and D is a divalent radical remaining after removal of hydroxyl groups from a low molecular weight diol having a molecular weight less than about 250;

with the provisos that the short chain ester units constitute about 25–65 weight percent of said copolyetherester; at least about 91% of said short chain ester units in the copolyetherester are identical and a homopolymer of such ester units in its fiber-forming molecular weight range, e.g. above about 5000, must melt between about 100 and 199° C. It is preferred that about 95% of said short-chain ester units are identical and most preferred that substantially all, e.g. 99–100%, of the short chain ester units are identical.

DETAILED DESCRIPTION

The term "long chain ester units" as applied to units in a polymer chain refers to the reaction product of a long chain glycol with a dicarboxylic acid. Such "long chain ester units," which are a repeating unit in the copolyetheresters of this invention, correspond to Formula a above. The long chain glycols are polymeric glycols having terminal (or as nearly terminal as possible) hydroxy groups and a molecular weight from about 400–6000. The long chain glycols used to prepare the copolyesters of this invention are poly(alkylene oxide) glycols having a carbon-to-oxygen ratio of about 2.0–4.3. Representative long chain glycols are poly(ethylene oxide) glycol, poly(1,2- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyl-tetrahydrofuran (used in proportions such that the carbon-to-oxygen mole ratio in the glycol does not exceed about 4.3).

The term "short chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by Formula b above.

It is essential that at least 91% and preferably at least about 95% of the dicarboxylic acid is 2,6-naphthalene dicarboxylic acid. In the most preferred embodiment of the instant invention substantially 100% of the dicarboxylic acid is 2,6-naphthalene dicarboxylic acid, e.g. 99–100%.

It is also essential to this invention that at least 91%, preferably about 95%, of the short segments are identical; it is most preferred that substantially 100%, e.g. 99–100%, of the segments are identical, and that the identical segments form a homopolymer in the fiber-forming molecular weight range (molecular weight >5000) having a melting point of about 100 to 199° C. Polymers meeting these requirements exhibit an unusual level of properties such as tensile strength and tear strength. Polymer melting points are conveniently determined by differential scanning calorimetry.

Included among the low molecular weight diols which react to form at least 91% of the short chain ester units are acyclic and alicyclic dihydroxy compounds having 3–15 carbon atoms. Preferred are aliphatic, straight-chain diols with 3, 5 or 7–10 carbon atoms; that is, trimethylene, pentamethylene, heptamethylene, octamethylene, nonamethylene, and decamethylene glycols. Especially preferred are straight chain aliphatic diols containing 3 or 5 carbon atoms. Equivalent ester-forming derivatives of diols are also useful. The term "low molecular weight diols" as used herein should be construed to include such equivalent ester-forming derivatives; provided, however, that the molecular weight requirement pertains to the diol only and not to its derivatives.

The remaining 9% or less of the short chain ester units can be derived from alicyclic or acyclic dihydroxy compounds having 2 to 15 carbon atoms. They would include all of the above mentioned diols and others such as ethylene glycol, butanediol, hexane dimethanol, dihydroxy cyclohexane and 2,2-dimethyltrimethylene glycol.

Dicarboxylic acids other than 2,6-naphthalenedicarboxylic acid which can be reacted with the foregoing long chain glycols and low molecular weight diols to produce the copolyetheresters of this invention are aliphatic, cycloaliphatic, or aromatic dicarboxylic acids of a low molecular weight, i.e., having a molecular weight of less than about 300. The term "dicarboxylic acids" are used herein, includes equivalents of dicarboxylic acids having two funtional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer of this invention.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloalipatic.

Representative aromatic dicarboxylic acids which can be used include terephthalic, phthalic and isophthalic acids, bibenzoic acid, substituted dicarboxy compounds with two benzene nuclei such as bis(p-carboxyphenyl) methane, p - oxy(p - carboxyphenyl) benzoic acid, ethylene - bis(p - oxybenzoic acid), 1,5 - naphthalene dicarboxylic acid, 2,7 - naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p(β-hydroxyethoxy) benzoic acid can also be used providing an aromatic dicarboxylic acid is also present.

Representative aliphatic and cycloaliphatic acids which can be used for this invention are sebacic acid, 1,3-cyclohexane dicarboxylic acid, 1,4 - cyclohexane dicarboxylic acid, adipic acid, glutaric acid, succinic acid, carbonic acid, oxalic acid, azelaic acid, diethylmalonic acid, allylmalonic acid, 4 - cyclohexene - 1,2 - dicarboxylic acid, 2-ethylsuberic acid, 2,2,3,3 - tetramethylsuccinic acid, cyclopentanedicarboxylic acid, decahydro - 1,5 - naphthalene dicarboxylic acid, 4,4' - bicyclohexyl dicarboxylic acid, decahydro - 2,6 - naphthalene dicarboxylic acid, 4,4'-methylenebis-(cyclohexane carboxylic acid), 3,4 - furan dicarboxylic acid, and 1,1-cyclobutane dicarboxylic acid.

The short chain ester units will constitute about 25–65 weight percent of the copolyetherester. The remainder of the copolyetherester will be the long segments, ergo, the long segment will comprise about 35–75 weight percent of the copolyetherester.

Most preferred segmented copolyetheresters for use in this invention are those prepared from 2,6-naphthalene dicarboxylic acid, glycols such as poly(tetramethylene oxide) glycol having a molecular weight of about 600–2000 or poly(ethylene oxide) glycol having a molecular weight of about 600–1500 and aliphatic, straight chain diols having 3,5 or 7–10 carbon atoms such as 1,5-pentanediol. Other preferred copolyetheresters are those prepared from 2,6-naphthalenedicarboxylic acid, and poly(propylene oxide) glycol having a molecular weight of about 600–1600. The polymers based on poly(tetramethylene oxide) glycol are especially preferred because they are easily prepared, have overall superior physical properties, and are especially resistant to water.

The dicarboxylic acids e.g. 2,6-naphthalenedicarboxylic acid or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol.

The polymers described herein can be made conveniently by starting with a conventional ester interchange reaction. A preferred procedure involves heating the dimethyl ester of 2,6-naphthalenedicarboxylic acid with a long chain glycol and an excess of 1,5-pentanediol in the presence of a catalyst at 150–260° C. while distilling off methanol formed by the ester interchange. Depending on temperature, catalyst, glycol excess, and equipment, this reaction can be completed within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the long chain glycol can be reacted with a high or low molecular weight short chain ester homopolymer of copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting prepolymer is then carried to high molecular weight by distillation of the excess of short chain diol. The process is known as "polycondensation."

Additional ester interchange occurs during this polycondensation or distillation; the distillation serves to increase the molecular weight and to randomize the arrangement of the copolyester units. Best results are usually obtained if this final distillation or polycondensation is run at less than 5 mm. Hg pressure and about 220–260° C. for less than 6 hours, e.g., 0.5 to 5 hours in the presence of antioxidants such as sym-dibeta-naphthyl-p-phenylenediamine and 1,3,5-trimethyl-2,4,6-tris[3,5-ditertiarybutyl-4-hydroxybenzyl]benzene. Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be used organic titanates such as tetrabutyl titanate used alone or in combination with magnesium or calcium acetates are preferred. Complex titanates, such as $Mg[HTi(OR)_6]2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The processes described above can be run both by patch and continuous methods. The preferred method for continuous polymerization, i.e., by ester interchange with a prepolymer, is a well established commercial process.

Although the copolyesters of this invention possess many desirable properties, it is sometimes desirable to stabilize certain of the compositions to heat or radiation by ultra-violet light. Fortunately, this can be done very readily by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4'-bis(2,6-ditertiary-butylphenol), 1,3,5-trimethyl-2,4,6 - tris[3,5-ditertiary-butyl - 4 - hydroxybenzyl] benzene and 4,4' - butylidene-bis(6 - tertiary-butyl-m-cresol). Various inorganic metal salts or hydroxides can be used as well as organic complexes such as nickel dibutyl dithiocarbamate, manganous salicylate and copper 3-phenylsalicylate. Typical amine stabilizers include N,N'-bis(betanaphthyl) - p - phenylenediamine, N,N' - bis(1-methylheptyl)-p-phenylene diamine and either phenyl-beta-naphthyl amine or its reaction products with aldehydes. Mixtures of hindered phenols with ethers of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft polyesters of this invention.

Because of their low-melting points, fast crystallization rates, unusually high tear strengths, tensile strengths, scuff resistance and low permanent sets the polymers of the instant invention can be utilized for a variety of purposes. For instance, the melting points, melt viscosities and stability characteristics of these polymers offer advantages for use in certain coating and adhesive procedures such as dip, transfer, roll and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendaring operations and allows penetration into the substrate, if desired.

All parts, proportions and percentages disclosed herein are by weight unless otherwise indicated.

The following examples illustrate the invention:

EXAMPLE 1

The following materials are placed in a 400 ml. reaction kettle fitted for distillation:

|  | Gm. |
|---|---|
| Poly(tertmethylene ether) glycol; number molecular weight about 980 | 23.2 |
| 1,3-propanediol | 12.3 |
| Dimethyl 2,6-naphthalenedicarboxylate | 32.0 |
| N,N'-di-beta-naphthyl-p-phenylenediamine | 0.165 |

A stainless steel stirrer with a paddle cut to conform with the internal radius of the kettle was positioned with the paddle about ⅛ inch from the bottom of the kettle. Air in the kettle was replaced with nitrogen; the kettle was placed in an oil bath at 200–210° C. After the reaction mixture liquified, 0.36 ml. of catalyst solution was added and agitation was initiated. Methanol distilled from the reaction mixture as the temperature of the oil bath was raised to 250–260° C. over a period of about 30 minutes. When the oil bath temperature reached 250–260° C., the pressure in the kettle was gradually reduced to 0.1 mm. of Hg or less over a period of about 40 minutes. The polymerization mass was agitated at 250–260° C. at less than 0.1 mm. of Hg until the viscosity of the melt no longer increases as determined by the speed of rotation of the stirrer; this required about 170 minutes. The resulting viscous molten product was scraped from the kettle in a nitrogen (water and oxygen free) atmosphere and allowed to cool.

The catalyst solution was prepared as follows: Magnesium diacetate tetrahydrate was dried for twenty-four hours at 150° C. under vacuum with a nitrogen bleed. A mixture of 11.2 gm. of dried and powdered magnesium diacetate and 200 ml. of methanol were heated at reflux for 2 hours. The mixture was allowed to cool and 44.4 ml. of tetrabutyl titanate and 150 ml. of 1,4-butanediol were added with stirring.

From the ratios of starting materials the copolymer was calculated to contain 50% (wt.) of the short chain ester units, trimethylene 2,6-naphthalenedicarboxylate. The properties of the copolymer are listed in Table I under A.

Similar procedures to the above were used to prepare 50% (wt.) pentamethylene 2,6-naphthalenedicarboxylate/poly (tetramethylene ether) 2,6-naphthalenedicarboxylate copolymer, the properties of which are listed in Table I under B, and 50% (wt.) decamethylene 2,6-naphthalenedicarboxylate/poly (tetramethylene ether) 2,6-naphthalenedicarboxylate copolymer listed in Table I under C. Samples for physical testing were compression molded at 232° C. Inherent viscosities were determined at 0.1 g./dcl. in m-cresol at 30° C.

The following melting points for the polyesters listed below are reported in the "Encyclopedia of Polymer Science and Technology," vol. 11, "Polyesters":

Poly(trimethylene 2,6-naphthalenedicarboxylate) 196–199° C.

Poly(pentamethylene 2,6-naphthalenedicarboxylate) 132–135° C.

Poly(decamethylene 2,6-naphthalenedicarboxylate) 143–144° C.

TABLE I

| | Copolymer | | |
|---|---|---|---|
| | A | B | C |
| Diol, number of carbon atoms | 3 | 5 | 10 |
| Reaction time at 250-60° C./<0.1 mm. Hg (min.) | 170 | 240 | 280 |
| Copolymer inherent viscosity | 1.7 | 1.8 | 1.5 |
| $M_{100}$ (p.s.i.) | 1,060 | 980 | 937 |
| $M_{300}$ (p.s.i.) | 1,300 | 1,780 | 1,515 |
| $T_B$ (p.s.i.) | 7,900 | 7,550 | 5,350 |
| $E_B$ (percent) | 525 | 590 | 620 |
| $P.S._B$ | 16 | 65 | 318 |
| Trouser tear 50 in./min. (p.l.i.) | 450 | 701 | 529 |
| Shore D hardness | 47 | 45 | 41 |
| Clash Berg, $T_{10,000}$ (° C.) | −15 | −5 | −27 |
| Copolymer DSC M.P. (° C.) | 168 | 108 | 125 |

The tensile strength and tear strength of copolymers A, B and C were exceptionally high, particularly in view of their melting points. The permanent set of copolymers A and B were surprisingly low for copolyetheresters.

EXAMPLE 2

A 50% (wt.) octamethylene 2,6-naphthalenedicarboxylate/poly(tetramethylene ether) 2,6-naphthalenedicarboxylate copolymer is prepared in a manner similar to that of Example 1 using the following materials:

Poly(tetramethylene ether) glycol; number average molecular weight about 980, gm _____ 23.2
1,8-octanediol, gm _____ 18.5
Dimethyl 2,6-naphthalenedicarboxylate, gm _____ 26.3
4,4′-bis(α,α-dimethylbenzyl)diphenyl amine, gm _____ 0.55
Catalyst solution of Example 1, ml _____ 0.36

The paddle stirrer used had a circular baffle ½ inch less in diameter than the inside diameter of the kettle. The baffle was positioned 2½ inches above the bottom of the kettle. The catalyst solution was added to the reaction mixture at an oil bath temperature of 173° C. Agitation under reduced pressure was carried out for 3 hours at 248–256° C. and 0.04 mm. of Hg or less. The polymeric product had an inherent viscosity at 0.1 gm./dcl. in m-cresol at 30° C. equal to 2.0. Samples for physical testing were compression molded at 232° C.

The properties of the copolyetherester copolymer were as follows:

$M_{100}$ (p.s.i.) _____ 1150
$M_{300}$ (p.s.i.) _____ 1820
$T_B$ (p.s.i.) _____ 6400
$E_B$ (percent) _____ 620
Trouser tear, 50 in./min. (p.l.i.) _____ 467
Shore D hardness _____ 48
Clash Berg, $T_{10,000}$ (° C.) _____ −29
Copolymer DSC, M.P. (° C.) _____ 149

According to the "Encyclopedia of Polymer Science and Technology," vol. 11, "Polyesters," poly(octamethylene 2,6-naphthalenedicarboxylate) has a M.P. of 183–185° C.

EXAMPLE 3

A 50% (wt.) heptamethylene 2,6-naphthalenedicarboxylate/poly(tetramethylene ether)2,6-naphthalenedicarboxylate copolymer was prepared in a manner similar to that of Example 1 using the following materials:

Poly(tetramethylene ether) glycol; number average molecular weight about 980, gm. _____ 23.2
1,7-heptanediol, gm. _____ 17.5
Dimethyl 2,6-naphthalenedicarboxylate, gm. _____ 27.3
4,4′-bis(α,α-dimethylbenzyl)diphenyl amine, gm. _____ 0.55
Catalyst solution of Example 1, ml. _____ 0.36

The paddle stirrer was equipped with a baffle as described in Example 2. After addition of the catalyst solution at 190–195° C., the reaction mixture was agitated for 30 minutes at an oil bath temperature of 190–195° C. before raising the oil bath temperature to 248–257° C. over a period of 20–25 minutes. The reaction mixture was agitated for 230 minutes at 248–257° C. and less than 0.05 mm. of Hg. The properties of the copolymer are listed under D of Table II.

Similar procedures to the above are used to prepare 50% (wt.) nonamethylene 2,6-naphthalenedicarboxylate/poly(tetramethylene ether) 2,6-naphthalenedicarboxylate copolymer, the properties of which are listed under E of Table II, and 30% (wt.) octamethylene 2,6-naphthalenedicarboxylate/poly(tetramethylene ether) 2,6-naphthalenedicarboxylate copolymer listed under F of Table II.

The following melting points for the polyesters listed below are reported in the "Encyclopedia of Polymer Science and Technology," vol. II, "Polyesters":

poly(heptamethylene 2,6-naphthalenedicarboxylate) 125–130° C.

poly(nonamethylene 2,6-naphthalenedicarboxylate) 122–124° C.

TABLE II

| | Copolymer | | |
|---|---|---|---|
| | D | E | F |
| Diol, number of carbon atoms | 7 | 9 | 8 |
| Reaction time at 249-257° C./<0.1 mm. of Hg | 230 | 200 | 255 |
| Copolymer inherent viscosity | 2.0 | 1.5 | 2.3 |
| $M_{100}$ (p.s.i.) | 980 | 530 | 620 |
| $M_{300}$ (p.s.i.) | 2,000 | 1,020 | 1,110 |
| $T_B$ (p.s.i.) | 7,500 | 5,600 | 3,880 |
| $E_B$ (percent) | 540 | 625 | 685 |
| $P.S._B$ (percent) | 60 | 147 | 170 |
| Trouser tear 50 in./min. (p.l.i.) | 588 | 395 | 171 |
| Shore A hardness | | 89 | 90 |
| Shore D hardness | 49 | 37 | 36 |
| Clash Berg, $T_{10,000}$ (° C.) | −8 | −34 | 53 |
| Copolymer DSC M.P. (° C.) | 113 | 101 | 113 |

The tensile and tear strengths of all the copolymers are exceptionally high, particularly in view of the copolymers melting points.

The following ASTM methods are employed in determining the properties of the polymers prepared in the preceding examples:

Modulus at 100% elongation, $M_{100}$ _____ D412
Modulus at 300% elongation, $M_{300}$ _____ D412
Tensile at break, $T_B$ _____ D412
Elongation at break, $E_B$ _____ D412
Permanent set at break, P.S.B. _____ D412
Hardness, Shore A _____ D676
Hardness, Shore D _____ D1484
Trouser tear _____ [1] D470
Clash-Berg torsional stiffness _____ D1053

[1] Modified by use of 1.5″ x 3″ sample with 1.5″ cut on the long axis of the sample. This configuration prevents "necking down" at the point of tearing.

What is claimed is:

1. A segmented thermoplastic copolyetherester composition consisting essentially of (a) a multiplicity of recurring long chain ester units and short chain ester units joined head-to-tail ester through linkages, said long chain ester units being represented by the formula I 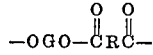

and said short chain units being represented by the formula

II 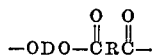

where G is a divalent radical remaining after the removal of terminal hydroxyl groups from a poly(alkylene oxide) glycol having a molecular weight of about 400–6000 and a carbon-to-oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided that at least 91% of the R groups utilized are derived from 2,6-naphthalenedicarboxylic acid, and at least 91% of said short chain ester units are identical (b) said short chain ester units amount to about 25–65 percent by weight of said copolyetherester and (c) a polymer in the fiber-forming molecular weight range formed solely from the short chain ester units has a melting point of 100–199° C.

2. A composition of claim 1 wherein at least about 95% of the R groups are derived from 2,6-naphthalene-dicarboxylic acid and at least about 95% of said short chain ester units are identical.

3. A composition of claim 2 wherein substantially all of the R groups are derived from 2,6-naphthalenedicarboxylic acid and substantially all of the short chain ester units are identical.

4. A composition of claim 1 wherein said glycol is poly(tetramethylene oxide) glycol having a molecular weight of about 600–2000.

5. A composition of claim 4 wherein said diol is 1,3-propanediol.

6. A composition of claim 4 wherein said diol is 1,5-pentanediol.

7. A composition of claim 4 wherein said diol is 1,10-decanediol.

8. A composition of claim 4 wherein said diol is 1,7-heptanediol.

References Cited
UNITED STATES PATENTS

| | | |
|---|---|---|
| 2,865,891 | 12/1958 | Michel. |
| 3,013,914 | 12/1961 | Willard. |
| 3,023,192 | 2/1962 | Shivers. |
| 3,651,014 | 3/1972 | Witsiepe. |

MELVIN GOLDSTEIN, Primary Examiner

U.S. Cl. X.R.

260—40 R, 45.75 R, C, N, 45.8 N, 45.9 R, 45.95, 47 C, 75 H, S

PO-1050
(5/69)

UNITED STATES PATENT OFFICE
CERTIFICATE OF CORRECTION

Patent No. 3775374  Dated November 27, 1973

Inventor(s) JAMES RICHARD WOLFE, JR.

It is certified that error appears in the above-identified patent and that said Letters Patent are hereby corrected as shown below:

Claim 1, line 55, "ester through" should be

--through ester--

Signed and sealed this 23rd day of April 1974.

(SEAL)
Attest:

EDWARD M.FLETCHER,JR.          C. MARSHALL DANN
Attesting Officer              Commissioner of Patents